United States Patent
Imhof

(10) Patent No.: US 9,606,550 B2
(45) Date of Patent: Mar. 28, 2017

(54) STREAMING GRAPHIC METHOD AND ARRANGEMENT FOR BUILDING CONTROL SYSTEMS

(71) Applicant: Siemens Industry, Inc., Alpharetta, GA (US)

(72) Inventor: Raphael Imhof, Palatine, IL (US)

(73) Assignee: SIEMENS INDUSTRY, INC., Alpharetta, GA (US)

(*) Notice: Subject to any disclaimer, the term of this patent is extended or adjusted under 35 U.S.C. 154(b) by 400 days.

(21) Appl. No.: 14/180,143

(22) Filed: Feb. 13, 2014

(65) Prior Publication Data

US 2014/0163747 A1 Jun. 12, 2014

Related U.S. Application Data

(63) Continuation of application No. 10/463,818, filed on Jun. 17, 2003, now Pat. No. 8,694,894.

(60) Provisional application No. 60/389,328, filed on Jun. 17, 2002.

(51) Int. Cl.
G06F 3/048 (2013.01)
G05D 23/19 (2006.01)
H04L 12/26 (2006.01)
H04L 12/24 (2006.01)

(52) U.S. Cl.
CPC ..... *G05D 23/1917* (2013.01); *H04L 12/2602* (2013.01); *H04L 41/22* (2013.01); *H04L 43/00* (2013.01); *H04L 43/045* (2013.01)

(58) Field of Classification Search
CPC .................................. G06F 3/00; G06F 3/048

USPC .......................................................... 715/749
See application file for complete search history.

(56) References Cited

U.S. PATENT DOCUMENTS

| | | | | |
|---|---|---|---|---|
| 6,546,419 B1 * | 4/2003 | Humpleman | ....... | H04L 12/2803 348/E7.05 |
| 6,868,293 B1 * | 3/2005 | Schurr | ............... | G05D 23/1905 323/211 |
| 6,934,862 B2 * | 8/2005 | Sharood | ............. | G06Q 30/0235 713/300 |
| 6,938,011 B1 * | 8/2005 | Kemp, II | ............... | G06Q 40/00 705/35 |
| 7,092,794 B1 * | 8/2006 | Hill | ........................ | G08C 17/02 700/108 |
| 7,103,511 B2 * | 9/2006 | Petite | ................. | G05B 23/0208 340/870.06 |
| 7,127,424 B2 * | 10/2006 | Kemp, II | ........... | G06Q 30/0275 705/14.71 |

(Continued)

*Primary Examiner* — David Phantana Angkool

(57) ABSTRACT

A building system server includes a processing device executing a server program. The processing device receives a request from a remote device for information regarding a building control system. The processing device provides, responsive at least in part to the request for information, at least one software program. The remote device executes the software program to: request and receive background graphic data corresponding to the request; request and receive first data identifying at least one variable control, and a format of the at least one variable control; request and receive second data containing a building control value corresponding to the at least one variable control; and cause a compatible web browser to build a graphics page based on the graphic data, first data and second data. The processing device provides the graphics page to the remote device.

11 Claims, 7 Drawing Sheets

(56) References Cited

U.S. PATENT DOCUMENTS

2003/0004853 A1* 1/2003 Ram .................. G06Q 40/04
705/37

* cited by examiner

STREAMING GRAPHIC METHOD AND ARRANGEMENT FOR BUILDING CONTROL SYSTEMS

RELATED APPLICATIONS

This application is a continuation of U.S. patent application Ser. No. 10/463,818, filed Jun. 17, 2003, which in turn claims the benefit of U.S. Provisional Patent Application Ser. No. 60/389,328, filed Jun. 17, 2002, which in its entirety is incorporated herein by reference.

FIELD OF THE INVENTION

The present invention relates generally to building systems, and more particularly, to remote monitoring of building control systems.

BACKGROUND OF THE INVENTION

Building control systems encompass a wide variety of systems that aid in the monitoring and control of various aspects of building operation. Building control systems include security systems, fire safety systems, lighting systems, and heating, ventilation, and air conditioning ("HVAC") systems. In large commercial and industrial facilities, such systems have an extensive number of elements and are highly automated.

The elements of a building control systems are widely dispersed throughout a facility. For example, an HVAC system includes temperature sensors and ventilation damper controls, as well as other elements, that are located in virtually every area of a facility. Similarly, a security system may have intrusion detection, motion sensors and alarm actuators dispersed throughout an entire building or campus. Likewise, fire safety systems include smoke alarms and pull stations dispersed throughout the facility. To achieve efficient and effective building control system operation, there is a need to monitor the operation of, and often communicate with, the various dispersed elements of a building control system.

To this end, building control systems typically have one or more centralized control stations in which data from the system may be monitored, and in which various aspects of system operation may be controlled and/or monitored. The control station typically includes a computer having processing equipment, data storage equipment, and a user interface. To allow for monitoring and control of the dispersed control system elements, building control systems often employ multi-level communication networks to communicate operational and/or alarm information between operating elements, such as sensors and actuators, and the centralized control station.

Initially, control stations provided building control data in text format, which typically required intimate system knowledge to interpret and understand. As building control systems become more complex, it has become increasingly advantageous to present building system data in a more intuitive manner. Thus, control stations of building control systems now generally employ graphical user interfaces that combine text information with representative graphics to illustrate the context of the system data being displayed.

An example of the use of representative graphics may be the use of a thermometer shaped graphic to represent a temperature reading, as opposed to a simple one line text value. Similarly, the alarm status for a floor of building may be represented on a graphical display of the building floor plan, as opposed to a simple text list of alarm locations.

One example of a building control system control station that employs a graphical user interface in the control station is the Apogee Insight™ Workstation, available from Siemens Building Technologies, Inc. of Buffalo Grove, Ill., which may be used with the model Apogee™ building control system, also available from Siemens Building Technologies, Inc. In this system, several control stations, connected via an Ethernet or another type of network, may be distributed throughout one or more building locations, each having the ability to monitor and control system operation. As a consequence, different people in different locations of the facility may monitor and control building operations.

While the use of multiple networked control stations provides a high level of convenience and efficiency, there has been a growing need to be able to monitor and/or control systems from offsite locations.

To address this need, the use of Internet access to a building control system has been proposed, as discussed in U.S. Pat. No. 6,157,943 to Meyer (hereinafter "the '943 patent"). The '943 patent describes a relatively straightforward system that incorporates ASP technology available from Microsoft Corporation of Redmond, Wash. to generate web pages that incorporate building control system information. The system described in the '943 patent builds graphical web pages that include building system data, and then transmits the graphical web pages to a web client. The '943 patent appears to describe the intended use of the ASP technology.

There are, however, significant limitations to the type of system described in the '943 patent. In particular, when building control system information is transmitted in a graphical image context, it requires significant bandwidth and download time. As a consequence, receiving updates over the Internet can be time consuming and inefficient as compared to receiving updates on a control computer that is connected directly to the building system network. While ongoing data communication developments improve Internet download speeds, it nevertheless can take significant time to download pages full of graphics. Moreover, if several clients access the same web server, the large, graphics-intensive downloads may slow the response time of the server, thereby also increasing the delay in receiving graphical build system user interface screens.

There is a need, therefore, for a method of providing faster and more frequent updates in a remote building system monitoring device using the Internet. Preferably, such a system would retain the ability present data in graphical format.

SUMMARY OF THE INVENTION

Present invention does this by providing streaming graphics by providing a first transmission that includes an interpreted-language program that builds and update graphics at a client computer so that updates to building system may be transmitted without large amounts of graphical data. As a result, updates to building control system graphical use interface may be provided over the Internet at relatively high speeds.

An embodiment of the invention is a building system server that includes a processing device executing a server program. The processing device receives a request from a remote device for information regarding a building control system. The processing device provides, responsive at least in part to the request for information, at least one software program. The remote device executes the software program to: request and receive background graphic data corresponding to the request; request and receive first data identifying at least one variable control, and a format of the at least one variable control; request and receive second data containing a building control value corresponding to the at least one variable control; and cause a compatible web browser to build a graphics page based on the graphic data, first data and second data. The processing device provides the graphics page to the remote device.

Another embodiment of the invention is an arrangement for displaying building automation information that includes a source of values pertaining to a building control system and a web server. The web server is operably connected to receive to obtain a first value from the source of values. The web server is further operable to provide an executable program file to a web client that, when executed by the web client, causes the web client to display at least a first graphical element, the first graphical element having a fixed element and a variable element, the variable element representative of the first value. The web server is also operable to obtain a second value from the plurality of values from the database server, and provide the second value to the web client as non-graphical information. The interpreted program causes the web client to display the first graphical element such that the variable element is representative of the second value.

Thus, the present invention avoids the problems of retransmission of graphics by merely retransmitting building control system values. The previously downloaded programs can then render a new graphic using the updated values and previously received graphic data. As a consequence, live streaming updates may be accomplished without retransmitting all of the graphic information.

The above described features and advantages, as well as others, will become more readily apparent to those of ordinary skill in the art by reference to the following detailed description and accompanying drawings.

DETAILED DESCRIPTION

Figure 1:
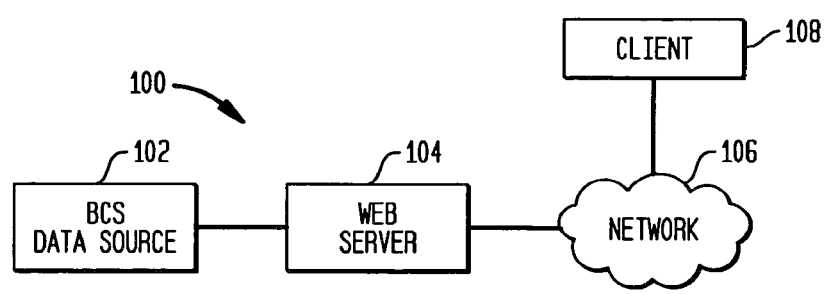
FIG. 1 shows a system block diagram of an arrangement for displaying building control system information according to the invention.

FIG. 1 shows a system block diagram of an exemplary arrangement 100 for displaying building automation information according to the invention. The arrangement 100 includes a building control system ("BCS") data source 102, a web server 104, a network 106 and a web client 108.

The BCS data source 102 preferably includes a data server that is operable to obtain a plurality of values representative of variables on a building control system in response to queries received from one or more external applications. A building control system is a distributed building system that provides control functions for any one of a plurality of building operations. As discussed above, building control systems may include HVAC systems, security systems, life or fire safety systems, industrial control systems and the like. An example of a BCS is the APOGEE™ system available from Siemens Building Technologies, Inc. of Buffalo Grove, Ill. The values representative of variables of the BCS includes values representative of temperature set points, air flow set points, actuator commands, alarms, temperature measurements, liquid or air flow measurements, device status, and the like. There are an extensive variety of BCS values that would be known to those of ordinary skill in the art.

Thus, the BCS data source 102 provides access to variables generated by the building system, such as alarm status, maintenance information, measured quantities such as temperature or air flow in an HVAC system, and may also provide access to control variables, such as temperature set points.

Figure 2:
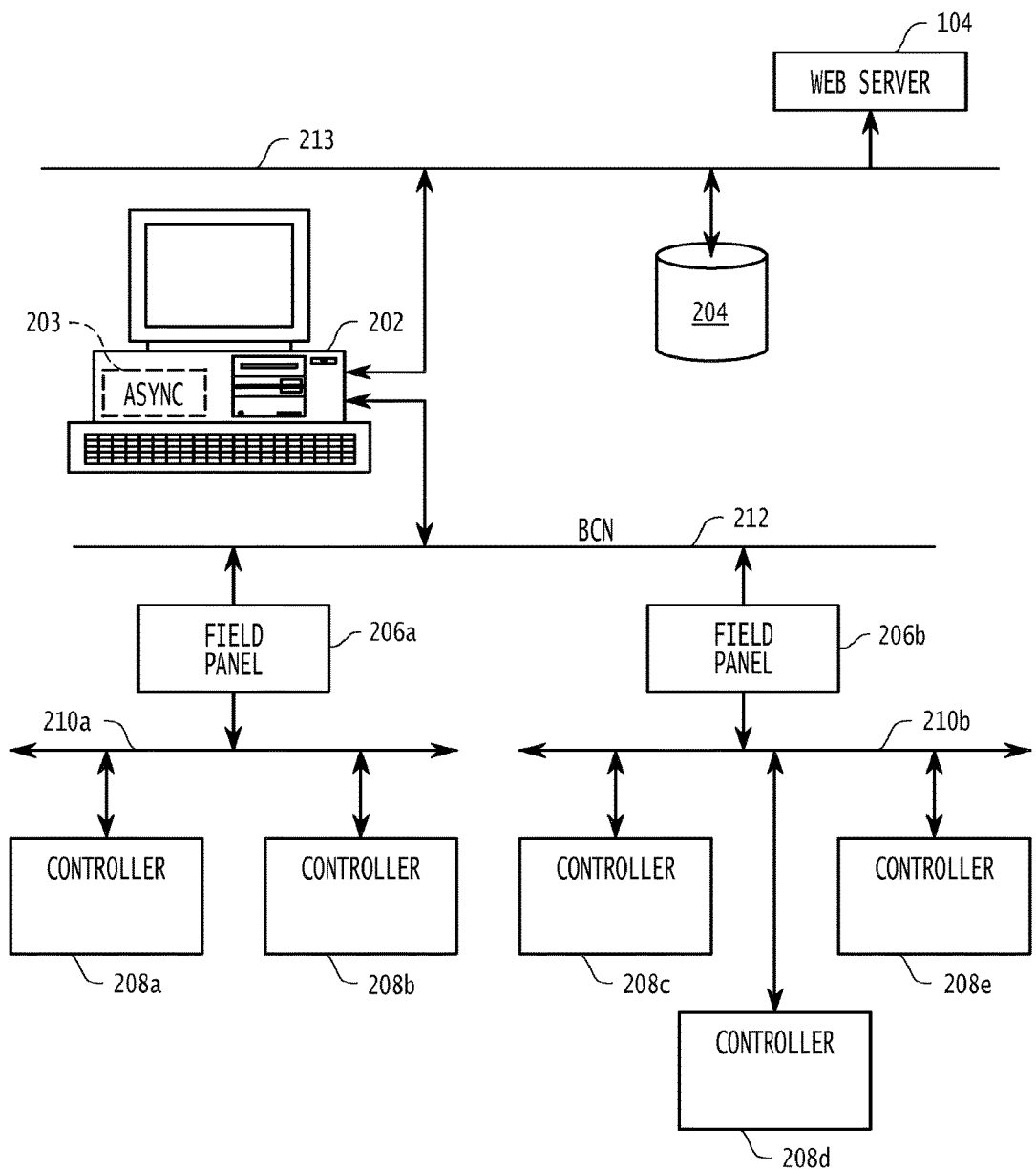
FIG. 2 shows a block diagram of an exemplary building control system that may be used as a source of building control system data in the arrangement of FIG. 1.

BCS systems are well known, and most if not all sophisticated building systems include data servers in which BCS variables may be accessed. While the BCS data source 102 may be a data server of any number of suitable types, the BCS data source 102 in the exemplary embodiment described herein may suitably include a DCOM server operable to provide data serving operations through a DCOM interface, as is well known in the art. The BCS data source may alternatively include any other commercially available BCS data server. FIG. 2, discussed further below, shows an exemplary block diagram overview of a BCS system having a data server that may be used as the BCS data source 102.

The web server 104 is a computer or other processing system that is programmed to carry out data operations for remote client computers such as the client 108. In general, such operations include obtaining BCS data from the BCS data source 102, and, preferably, also providing BCS commands to the BCS data source 102.

To provide such operations for clients, the web server 104 is connected to various clients, including the client 108, via a network 106. In the exemplary embodiment described herein, the network 106 is the Internet. However, in other embodiments, the web server 104 may be connected to the client 108 via another type of network.

The client 108 preferably includes web browser software capable of performing typical web browser functions, such as interpretation of mark-up languages such as HTML, and interpretation of a universal (or "virtual machine") programming language such as Java or ActiveX. Such web browser software is well known and may suitably be the commercially available Netscape Navigator browser software, Windows Explorer browser software, or the like.

In a first operation of the arrangement 100, the web server 104 provides BCS data in graphical user interface format to the client 108 via the network 106. To this end, the web server 104 is operably connected to, among other things, obtain a first value from the BCS data source 102. The web server 108 may access the BCS data through a DCOM object or component of a DCOM BCS data server, not shown (see FIG. 2), using a data request. Those of ordinary skill in the art would know how to employ a DCOM component to obtain data from a DCOM data server.

In particular, in one exemplary embodiment, the web server 104 is operable to execute a VB script that causes establishment of a DCOM object through which data may be retrieved from the data server 102. The DCOM object or component allows a data request to, among other things, read data from, or write data to, the BCS data source 102. To enable establishment and use of the DCOM object from a VB script, the VB script uses the DCOM automation interface, as is known in the art. Information regarding the use of the VB script and the DCOM automation interface is known to those of ordinary kill in the art and generally available by or through Microsoft Corporation of Redmond, Wash.

Once the web server 104 provides BCS data in graphical user interface format to the client 108 via the network 106, the client 108 is operable to display the BCS data in a graphical interface.

To this end, in the exemplary embodiment described herein, the web server 104 is further operable to provide an executable program file to a web client that, when executed by the web client, causes the web client to display at least a first graphical element. The executable program file is preferably a Java language file interpreted by the web browser on the client 108. The first graphical element is representative of BCS information and includes a fixed element and a variable element. The variable element of the first graphical element is representative of the BCS data value obtained from the BCS data source 102. The fixed element includes contextual graphical images relating to the BCS.

Figure 3:
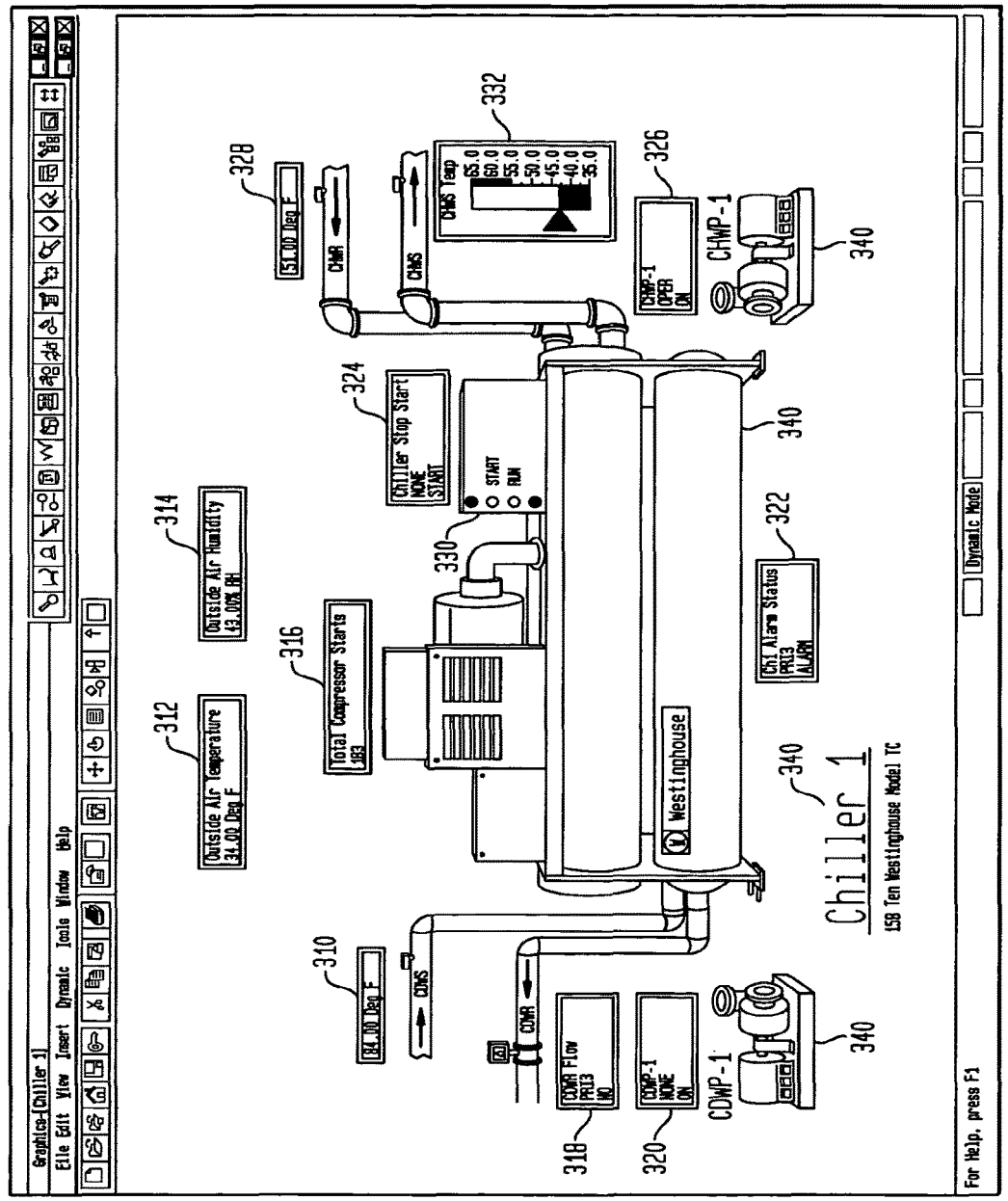
FIG. 3 shows an exemplary graphic page that may be generated and updated in accordance with the present invention.
Figure 5:
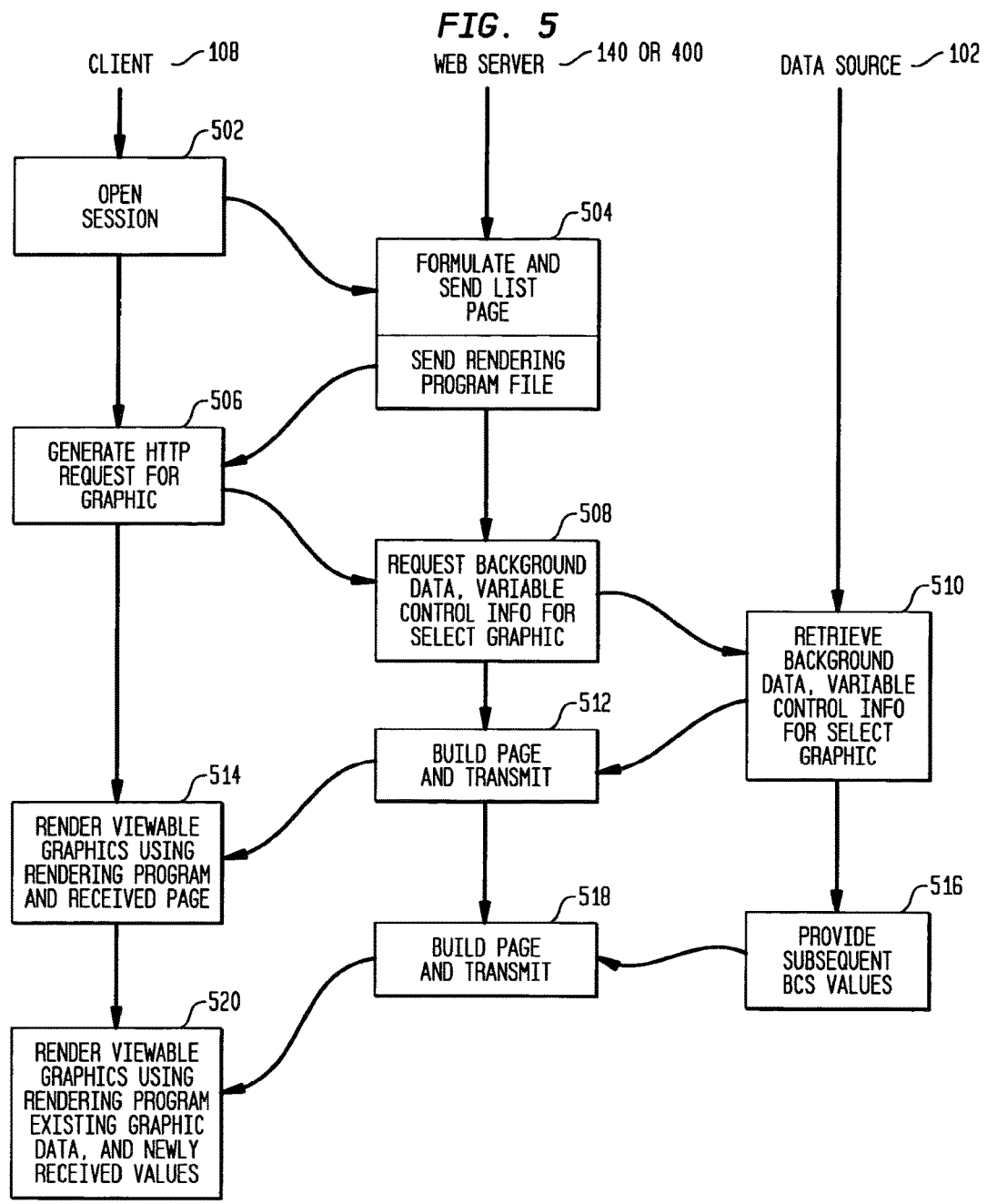
FIG. 5 shows an exemplary flow diagram of the steps performed by the arrangement of FIG. 1.

In particular, it is common for BCS data to be represented on a visual display as a combination of variable or active graphical elements, sometimes referred to as controls, and fixed or static elements, referred to collectively as a background. FIG. 3, by way of example, shows a chiller plant graphic element having a plurality of variable controls 310, 312, 314, 316, 318, 320, 322, 324, 328, 330 and 332 and a set of static elements that collectively constitute the fixed background graphic 340. Another example is shown in FIG. 5 of U.S. Pat. No. 6,157,943, wherein the active controls includes variable controls 8184 and the fixed background graphic is the "floor plan" graphic of FIG. 5.

The web server 104 is thus operable to generate one or more routines in an executable program file, such as one or more Java scripts or programs, that when executed by the client 108, build graphic pages that include fixed graphic elements and variable graphic elements. To this end, the web server 104 provides the executable program file, the raw graphical information for the fixed graphic element, and instructions for rendering the variable graphic elements based on received BCS values. The web server 104 further provides at least a first BCS value for use in rendering at least one variable graphic element. The first BCS value may be transmitted along with the executable program file, but typically will be transmitted in a later transmission.

Thus, by way of example, to cause the client 108 to render the graphic element 300 of FIG. 3, the web server 104 would transmit 1) the graphic data for the background element 340, 2) Java-language instructions for rendering the background element 340, 3) Java-language instructions for rendering the variable controls 310-332, and 4) the values for populating the variable controls 310-332, such as temperature values, alarm status values, and the like. The Java instructions are preferably provided as a Java Applet that controls overall operation of the graphics operations, and Java Beans that define the configurations for the variable controls.

The client 108, executing the interpreted (e.g. Java) program previously provided by the web server 104, then displays the first graphical element such that the variable element is representative of the first BCS value. Consider an example in which the client 108 renders the graphic element 300 of FIG. 3. In such a case, the client 108 renders the variable control 312 to include the BCS value of 34.00.degree., and renders the variable control 332 to graphically depict the BCS value of 42.5.degree.

The web server 104 is further operable to provide updates to the graphic element generated by at the client. To this end, the web server 104 is operable to provide one or more subsequent BCS values from the BCS data source 102. The subsequent values are in non-graphical format, and are generally updates to the previously received BCS values. For example, if the first BCS value was a temperature value, then the subsequent value would be an updated version of that temperature value.

The client 108, executing the interpreted program previously provided by the web server 104, then displays the first graphical element such that the variable element is representative of the subsequent value. Thus, for example, if the first graphical element is the graphic 300 of FIG. 3, and the variable element is the control element 312, then the interpreted program would change the temperature value displayed in the variable control element 312 based on the subsequent value received from the web server 104. As a consequence, the appearance of the first graphic element on the client 108 may be changed based on newly received values from the web server 104.

Because the subsequent value is in the form of non-graphical information, for example, numeric or text data, transmission of the subsequent value over the network 106 requires relatively little bandwidth and download time. Thus, while the initial transmission of the executable program and fixed graphical data over the network 106 requires more substantial bandwidth, such transmission need not be repeated for each update to the graphics page. Thus, multiple subsequent updates to the graphic page displayed at the web client 108 may occur using little bandwidth, and requiring relatively short download time. By contrast, prior art devices transferring completed web pages with significant amounts of graphical image information with each update require relatively far more download time.

Moreover, even if the subsequent value included some graphical information, it is still more efficient to download only updates to the BCS values in whatever format, as opposed to the entire graphic page.

Referring now in greater detail to the BCS data source 102, the BCS data source 102 as discussed above preferably includes a DCOM data server that has access to relatively current variable values in the BCS system. Such servers are known in the art.

FIG. 2 shows an exemplary, representative block diagram of a building control system 200 that includes an exemplary embodiment of the BCS data source 102 of FIG. 1. The building control system 200 includes at least one supervisory control system 202, a system database 204, plural field panels 206a and 206b, and plural controllers 208a-208e. It will be appreciated, however, that wide varieties of BCS architectures may be employed.

Each of the controllers 208a-208e represents one of plurality of localized, standard building control subsystems, such as space temperature control subsystems, lighting control subsystems, or the like. Suitable controllers for building control subsystems include, for example, the model TEC (Terminal Equipment Controller) available from Siemens Building Technologies, Inc., of Buffalo Grove, Ill. Larger, more complex subsystems such as chiller plant control subsystems may employ a model UC (Unitary Controller) programmable controller, also available from Siemens Building Technologies.

Groups of subsystems such as those connected to controllers 208a and 208b are typically organized into floor level networks ("FLNs") and generally interface to the field panel 206a. The field panel 206a may suitably be any Apogee field panel device available from Siemens Building Technologies. To facilitate communications among the devices, the FLN data network 210a is a low-level data network that may suitably employ any suitable proprietary or open protocol. Subsystems 208c, 208d and 208e along with the field panel 206b are similarly connected via another low-level FLN data network 210b.

The field panels 206a and 206b are also connected via a building level network ("BLN") 212 to the supervisory computer 202 and the database 204. The field panels 206a and 206b thereby coordinate the communication of data and control signals between the subsystems 208a-208e and the supervisory computer 202 and database 204. The supervisory computer 202 provides overall control and monitoring of the building control system 200 and includes a user interface. The supervisory computer 202 further operates as a BCS data server that exchanges data with various elements on the 200 via an asynchronous data server 203. The BCS data server can also exchange data with the database 204. The BCS data server (i.e. BCS data server 102) allows access to the BCS system data by various applications. Such applications may be executed on the supervisory computer 202 or other supervisory computers, not shown, connected via a management level network ("MLN") 213.

To this end, in the exemplary embodiment described herein, the BCS data server includes a DCOM data server. Implementation of a DCOM server on a building system having the generalized architecture 200 would be known to those of ordinary skill in the art.

The asynchronous data server 203 is a function that obtains data from (and transmits commands to) various elements of the system 200 upon request. To this end, as requests for certain values are made to the BCS data server on the supervisory computer 202, the asynchronous data server 203 determines which element of the system 200 stores and/or generates the requested data. For example, if a measured temperature value for a particular zone is requested, the asynchronous data server 203 determines the identity of the device that measures the temperature and, and the identity the subsystem 208x on which the device is located. The asynchronous data server 203 generates a request to the corresponding network manager 206x, which in turn obtains the data from the temperature measurement device on the subsystem 208x. Such systems and data manipulations on a building control system are generally known in the art.

The supervisory computer 202x is operably connected to the web server 104, not shown in FIG. 2, the database 204, and other supervisory computers, not shown, via the MLN 213 that may suitably be an Ethernet. The supervisory computer 202 uses the MLN 213 to communicate BCS data to and from other elements on the MLN 213, including the web server 104.

The database 204 stores historical data, error data, system configuration data, graphical data and other BCS system information. In the embodiment described herein, the database 204 also stores the background data for the fixed graphic elements, as well as the configuration information for the variable control graphics. Storage of the graphical information within the system 200 allows other computers in the system 200 to obtain and render graphics without necessarily employing an Internet connection and thus without using the web server 104 of FIG. 1. However, in alternative embodiments, much or all of the graphic data may be stored in a device associated more directly with the web server 104, for example, internal memory of the web server 104 such as an internal hard drive.

The MLN 213 may connect to other supervisory computers, not shown, Internet gateways including, by way of example, the web server 104, or other gateways to other external devices, not shown, as well as to additional network managers (which in turn connect to more subsystems via additional low level data networks). The MLN 212 may suitably comprise an Ethernet or similar wired network and may employ TCP/IP, BACnet, and/or other protocols that support high speed data communications.

Thus, the system 200 shows an example of a building control system architecture that includes a BCS data source 102 in the form of the supervisory computer 202. It will be appreciated that other BCS architectures may be used in connection with the present invention.

Figure 4:
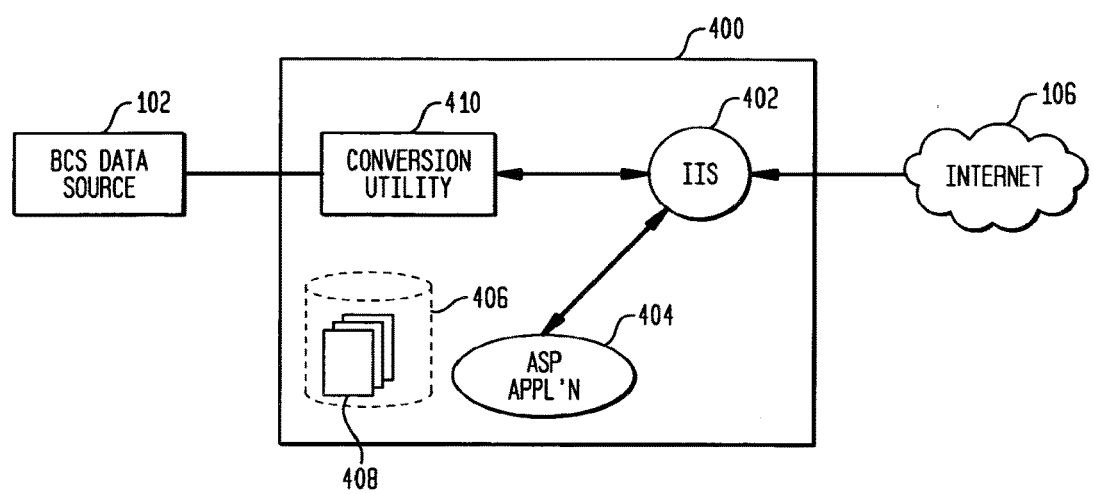
FIG. 4 shows in further detail a block diagram of an exemplary web server that may be used as the web server of FIG. 1.

FIG. 4 shows in further detail an exemplary embodiment of a web server 400 that may be used as the web server 104 of FIG. 1. The web server 400 in the exemplary embodiment described herein is operable to generate web pages and communicate web pages and other data to clients, such as the client 108, over the Internet. The web server 400 includes a conventional IIS server 402 that includes Active Server Pages ("ASP") functionality 404, storage devices 406 that store, among other things, ASP pages 408, and an optional conversion utility. The IIS server 402 having ASP functionality 404 is a commercially available software product, available from Microsoft Corporation of Redmond, Wash., that allows for the automated generation of HTML, XML or other pages using dynamic data.

Further explanation and function of the IIS server 402, the ASP functionality 404 and the ASP pages 408 is provided below in connection with the discussion of FIG. 5. FIG. 5 shows in detail an exemplary diagram of the operations of the various elements of FIGS. 1 and 4 in accordance with aspects of the invention. For the purposes of FIG. 5, it will be assumed that the web server 400 shown in FIG. 4 is the web server 104 of FIG. 1. The sequence of operations described in FIG. 5, as well as the software elements used to carry out the operations, are only an exemplary way of carrying out the present invention. Thus, while elements of the embodiment described in connection with FIG. 5 has particular advantages, at least some of the advantages of the invention may be obtained in other embodiments that generally provide Internet updates to graphics without re-downloading the entire graphic with each update.

The exemplary graphical display operation of BCS data at the client 108 begins when the client 108 contacts the web server 104 to open or begin a session (step 502). To this end, the client 108 transmits an http request with the web server's URL over the Internet 106. The web server 104 will typically execute an authentication procedure to determine whether the user at the client 108 has access to the BCS data. Any suitable authentication procedure, including ID and password verification, may be used.

After the user at the client 108 has been authenticated, the session is opened and the web server 104 causes a first page to be generated and transmitted (step 504). The first page is an HTML page that includes a list of selectable graphics pages. For example, the list would allow the user to select any of a plurality of graphic pages, such as, for example, the graphics page 300 of FIG. 3.

To this end, the ASP functionality 404 causes generation/execution of a first ASP page 408 in the exemplary embodiment described herein. The first ASP page 408 both generates the HTML page with the list of graphics and runs a VB script that causes a first main DCOM object to be established in the BCS data source. The first main DCOM object is generated using the DCOM automation interface as is known in the art (step 505). However, the data source 102 may employ a DCOM custom interface as is known in the art to allow for greater functionality.

In particular, it is known in the art that the DCOM custom interface provides for greater flexibility and functionality in a DCOM server. Thus, although only the more limited DCOM automation interface is generally-accessible using VB script, it is often desirable that the BCS data source 102 employ a DCOM custom interface. Because VB script run by the ASP page 408 cannot use a DCOM custom interface, the DCOM object operations requested by the VB script on the ASP page must be converted from the DCOM automation interface to the DCOM custom interface. To convert between the DCOM custom interface and the DCOM automation interface, the conversion utility 410 performs a DCOM wrapper function that translates DCOM automation interface objects into a DCOM custom interface object usable by the DCOM server of the data source 102. The generation of such a wrapper function for the DCOM automation interface to provide access to any particular DCOM custom interface would be known to those of ordinary skill in the art and who have knowledge of the custom interface.

In any event, in step 505, the main DCOM object on the data source 102 is opened via the first ASP page. As discussed above, the first ASP page also generates an initial HTML page of graphic page links to be provided to the client 108. The list is in the form of a list of hyperlinks, one for each selectable graphics page.

The web server 104 transmits the generated initial page that displays a list of graphic pages that may be viewed. Upon receiving the page generated in step 504, the web browser software in the client 108 displays the web page. In particular, the web browser causes the display of the list of hyperlinks to the available graphic pages. The user may then select a graphics page for display by selecting one of the hyperlinks. Upon selection of a hyperlink corresponding to a select graphics page, the client 108 generates an http request for the select graphics page (step 506). The client 108 transmits the http request to the web server 104 over the Internet 106.

Referring to FIG. 4, the IIS server 402 of the web server 400 receives the http request and executes instructions from a second ASP page 408 using the requested graphics page name as a parameter "graphics_name" (step 508). In general, execution of the second ASP page 408 causes a specific DCOM graphics object to be set up in which graphical image data and graphic configuration parameters for the select graphic may be accessed. It is noted that in the exemplary embodiment described herein, the background graphic data and variable control configuration information is accessed through the BCS data source 102, and may, for example, be stored in the database 204 of FIG. 2. The second ASP page 408 also transmits the interpreted language program file that renders the graphics, as will be discussed further below.

To this end, the second ASP page 408 uses a VB script to parse the graphics_name information from the http request. The VB script then generates a get-graphics call for the graphics_name as a DCOM object or component. The data server 102 sets up a DCOM graphics object, and then retrieves in memory (i.e. the BCS database 204) the stored graphics information file corresponding to the graphics_name (step 510). The file includes background graphics image data and configuration data for the variable controls, as well as instructions as to where to locate the variable controls on the graphics page. Each selectable graphic has associated with it a custom graphics information file.

After the DCOM graphics object is created and instantiated with data from the graphics information file associated with graphics_name, the second ASP page 408 generates an HTML page containing the interpreted program file (i.e. the Java Applet), and the graphics_name as a parameter (step 512).

The web server 104 transmits the HTML page to the client. 108. The interpreted language program file is received and executed at the client 108. In general, interpreted language program file is operable to cause a compatible web browser to 1) request and receive background graphic data (in JPEG or PNG format, e.g.), 2) request and receive XML files identifying a number of variable controls, their format and location, and 3) request and receive XML files containing BCS values corresponding to the variable controls. The interpreted language program file is further operable to cause a compatible web browser to build a graphics page based on the received data, the graphics page include the static background image and a number of variable controls, the variable controls each displaying information representative of at least one BCS value.

In step 514, the client 108, executing the downloaded program, generates an http request to a third ASP page 408. The IIS server 402 receives the request and executes the third ASP page 408 (step 516). The third ASP page 408 uses VB script to obtain a definition for the graphic graphics_name from the DCOM graphics object set up in step 510. As discussed above in connection with step 510, the DCOM graphics object provides access to the file containing the graphics definition for the graphics_name. The graphics definition includes the background graphics and variable control configuration data for the requested graphics page. The VB script thus obtains the background graphics and variable control configuration data. The third ASP page 408 generates an XML page therefrom. The IIS provides the XML page containing the graphics definition to the client 108 (step 518).

In further detail, the ASP page 408 provides the background graphic data in the constructed XML page as compressed (or uncompressed) image data. A particular format, for example, JPEG or PNG, should be used for all graphics to simplify the downloaded interpreted program. If background graphics are stored in the BCS data source 102 in a variety of formats, the web server 104 may translate the background image data to a format compatible with the downloaded interpreted program.

The ASP page 408 also provides XML files or paragraphs that describe the configuration of the variable controls on the requested graphics page. The variable controls are preferably in one of a finite number of predefined formats.

For example, referring to FIG. 3, the variable control may have a simple block format such as elements 310, 312, 314, 316, 318, 320, 322, 324, 326, 328 and 330. Alternatively, the variable control may alternatively have a bar graph format, such as the element 332 of FIG. 3. While the block format provides data values as a normal text value, the bar graph can illustrate a number value graphically on a scale. Other graphical representations of values include a radial gauge format, similar to a speedometer of a vehicle.

Each format has a generalized appearance, but has variable configuration parameters that modify its appearance. The format and configuration of each variable control is specified for each available graphics page.

Referring now specifically to the block formatted elements, such as elements 310, 312 etc., the configuration parameters may include layout information as well as information identifying which of the available BCS data values should be displayed. In particular, the configuration parameters define the color, layout, width, border style, and whether to show a name, a descriptor, a status value, a priority value, another value, units, or a total.

Similarly, a bar graph formatted element may include similar configuration parameters, but include other parameters specific to rendering a bar graph. For example, bar graph parameters may include parameters defining the upper value limit of the bar graph, the lower limit of the bar graph, the number of large and small "ticks", and whether an adjustable command slide control should be included. Referring to FIG. 3, it will be appreciated that the bar graph element 332 is configured to have a low value limit of 35.0, a high value limit of 65.0, a Descriptor of "CHWS Temp", and an adjustable command triangle. All of these features are defined in the XML configuration for that particular variable control.

It will be appreciated that other graphic control formats, for example, a radial gauge as discussed above, may be parameterized and configured in a similar manner.

To provide the predefined parameter or configuration information to the web client, the customizing configuration information is preferably formulated as an XML file. The following XML file format or schema may be used to pass configuration information for each element having a block format.

```
<ElementType name="infobloc" content="eltOnly">
    <element type="lColorStyle" />
    <element type="lLayoutStyle" />
    <element type="lColumnWidths" />
    <element type="bShowName" />
    <element type="bShowDescriptor" />
    <element type="bShowStatus" />
    <element type="bShowPriority" />
    <element type="bShowValue" />
    <element type="bShowUnits" />
    <element type="bShowTotal" />
    <element type="sBorderStyle" />
</ElementType="ColorStyle" />
```

The XML structure is parsed by the graphics generating routine that is included in the interpreted-language program file previously provided to the client 108 in step 514.

While the configuration information defines the look and feel of the variable control, it is the actual BCS data values that determine the final appearance. Indeed, the purpose of the variable controls is to graphically present the BCS data values. However, in the embodiment described herein, the ASP page 408 initially (in step 518) formulates the XML page without actual BCS value data.

The client receives the graphics definition in the XML page (step 520) and begins rendering the graphics page, even though actual BCS values have not been received. To this end, the interpreted language program parses the received XML page and generates the graphics based on the background graphic data and the variable control configuration information contained therein.

The interpreted program further causes the client 108 to generate another http request to yet another ASP page 408 that contains a request for all the BCS values related to the graphics_name graphics page (step 522). The IIS server 402 receives the http request. The ASP page 408 then, using VB script, obtains any updated values from the DCOM graphics object. To this end, it is noted that the DCOM graphics object is configured to obtain updates to any BCS values associated with the graphics page. As long as the DCOM graphics object is open, the DCOM graphics object also receives and changes to any of the BCS values associated with the graphics name graphics page.

The ASP page 408 generates an XML document that contains the BCS values for the graphics page (step 524) and provides XML document to the client 108. The BCS data or values are sent as raw text or numeric data, as opposed to graphic or image data.

The client 108 receives the BCS values and refreshes the previous "empty" graphic page by adding the BCS value information when rendering the variable control elements of the graphics page (step 526). The finished graphics page may, for example, resemble the graphics page of FIG. 3, or that of FIG. 5 of U.S. Pat. No. 6,157,943. In any event, the graphics page preferably includes static background graphics and a plurality of variable controls, each of the variable controls containing information representative of a BCS value. For example, the graphic 312 of FIG. 3 shows a variable control containing information representative of a BCS temperature value, the value being 34.00.

In summary, to build the graphics page, the client 108 web browser executes the interpreted-language program that had been during step 514. Under the control of that program, the client 108 parses the XML data and builds the background using the graphical data contained within the XML document. The client 108 also parses the variable control configuration information, and instantiates the variable control graphics using predefined rules for forming the variable control graphics. As discussed further above, these predefined rules are part of the interpreted language program files downloaded in step 514.

The client 108 further parses the BCS data values and uses them in the final rendering of the variable controls. By way of example, to render the bar graph element 332 of FIG. 3, the client 108 parses the XML configuration information for that control to generate the overall structure of bar graph element 332, and uses a received BCS temperature value of 42.5 to determine the level or reference tick to which to extend the solid bar of the bar graph.

Once the background graphics and the variable controls have been generated or rendered, the result is a viewable graphics page, such as, for example, the graphics page 300 of FIG. 3.

In accordance with one aspect of the invention, the viewable graphics page generated at the client 108 may be updated without retransmitting all of the graphic data. In particular, due to the interpreted-language program and the predefined XML structures of the graphic controls, the client 108 may redraw or update the graphics page with the same background and variable controls, but with different BCS values. The different BCS values will be reflected in the corresponding variable controls. For example, if client 108 were to redraw the graphics page 300 of FIG. 3 after the value for the CHWS Temp changes to 45.0, then the client 108 would redraw the bar graph element 332 with the bar graph filled in up to the reference tick corresponding to the value 45.0 To this end, the web server 104 obtains updates to the BCS values from the BCS data source 102 by executing an ASP page using a VB script to obtain any changed values from the DCOM graphics object (step 528). The ASP page provides updates to the BCS values as XML files to the client 108 (step 530). The client 108 parses the XML files and uses the parsed BCS values (and the previously provided configuration information and background graphics data) to redraw (the affected portion of) the graphics page (step 532).

Figure 6:
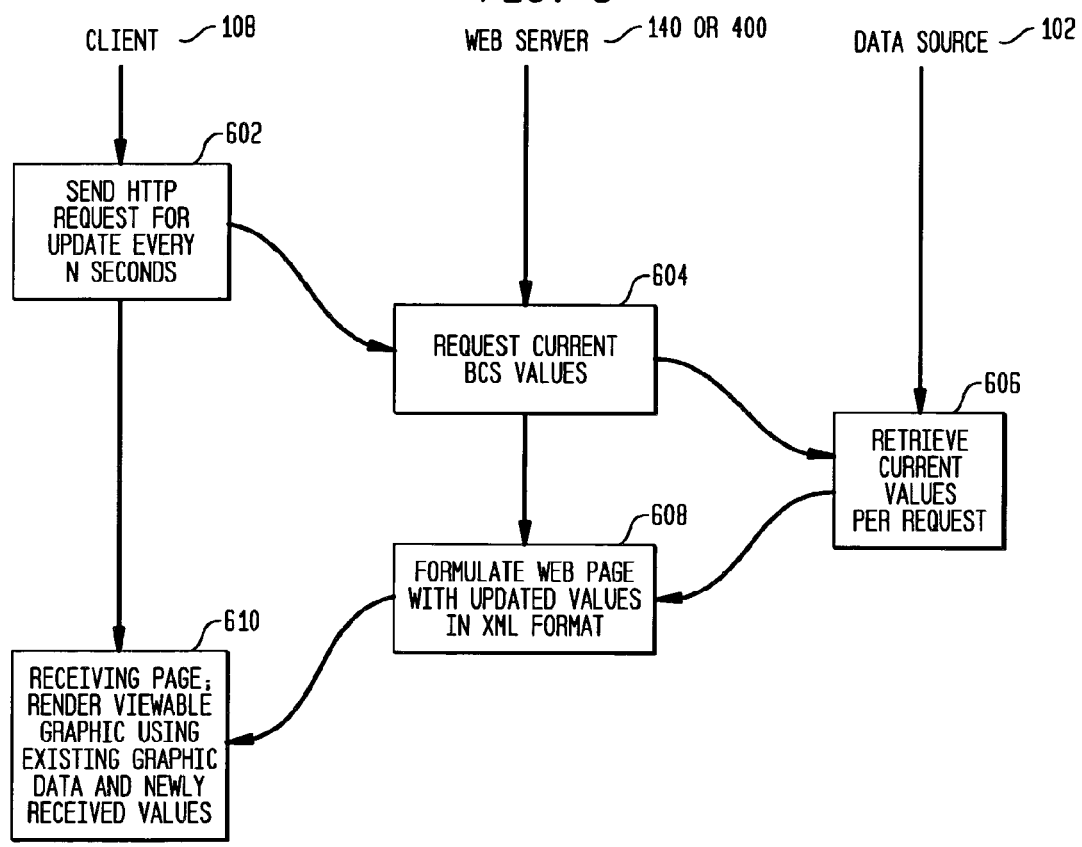
FIG. 6 shows an exemplary flow diagram of the steps performed by the arrangement of FIG. 1 to poll updated building control system values.
Figure 7:
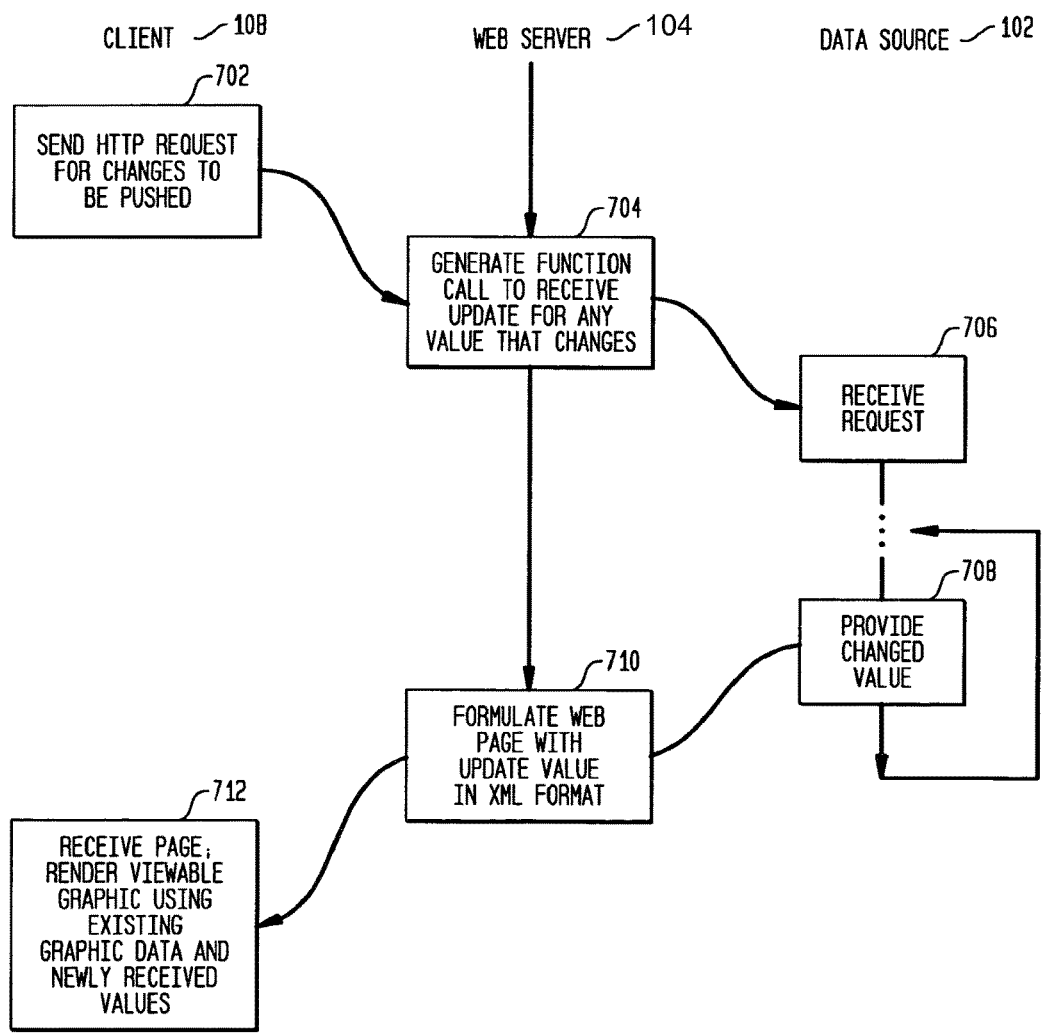
FIG. 7 shows an exemplary flow diagram of the steps performed by the arrangement of FIG. 1 to push updated building control system values.

In the embodiment described herein, there are two methods in which updates to the BCS values may occur. Updates to the BCS values may be polled by the client 108 on a scheduled (or unscheduled) basis, or updates may be pushed by the web server 104 to the client 108 as they occur. FIG. 6 shows an exemplary set of operations for updating BCS values (steps 528-532) wherein the updates are polled. FIG. 7 shows an exemplary set of operations for updating BCS values (steps 528-532) wherein the updates are pushed.

Referring to FIG. 6, the downloaded interpreted-language programs at the client 108 cause the transmission of an update request (as an http request) over the network 106 every N seconds (step 602). The request preferably represents a request for an update to any BCS values represented by the variable controls on the displayed graphics page. The IIS server 402 receives the request and causes its ASP functionality 404 to construct a responsive XML page. To this end, an ASP page 4008 executes a VB Script to request any changed BCS values from the DCOM graphics object of the BCS data source 102 (step 604).

The BCS data source 102, which maintains updated BCS values in the established DCOM graphics object, provides the changed BCS values (step 606). It is noted that the BCS data source 102 may obtain the updated values in a plurality of ways known in the art.

Regardless of how the BCS data source 102 obtains the updated values, the BCS data source 102 provides the updated values to the ASP page 408. (See FIG. 4). The ASP page 408 formulates an XML document containing the updated BCS values received from the BCS data source 102. The IIS server 402 transmits the XML document to the client 108 (step 608). The client 108 receives the XML document and redraws any affect portions of the graphics page (step 610). To this end, the client 108 employs the downloaded interpreted language program, the previously received background graphic data, the previously received variable control configuration information and the newly-received and parsed BCS update values and redraws the graphics page in a manner similar to that described above in connection with step 526 of FIG. 5.

The steps 602-610 are then repeated every N seconds until the client 108 selects another graphics page or closes the session. Because web server 104 provides updated values while transmitting little or no graphical information over the network 106, the graphic update technique described above provides streaming graphic updates using relatively little bandwidth of the network 106, and requiring relatively little download time over the network 106. As a consequence, high quality streaming graphic representation of building control system data may be provided to client computers having a wide range of Internet access speeds. Even in clients having fast access speed, the reduced data content required to be transmitted eases the computational load on the web server 104, thereby facilitating better results and reduced cost in providing the streaming graphic services.

As discussed above, the new values may alternatively be pushed from the web server 104 instead of polled. To this end, the client 108 may generate an http request to receive updates to BCS values only if the relevant BCS values change. The client 108 transmits this http "push" request to the web server 104 (step 702).

The IIS server 402 receives the push request. In response, the above described ASP page 408 executes a VB Script to obtain updated BCS values for the graphics page via the DCOM graphics object of the BCS data source 102 (step 704). The call function causes the BCS data source 102 to provide updates to any of the BCS values associated with the graphics page currently displayed by the client 108 (step 706).

Thereafter, anytime a relevant BCS value is updated, the BCS data source 102 provides the updated values to the ASP page 408 (step 708). Upon receiving an update, the ASP page 408 formulates an XML web page containing the updated BCS values. The IIS server 402 transmits the web page to the client 108 (step 710). The client 108 receives the web page and redraws the graphics page (step 712), and further provides a new push request for the next change in value (step 702). To render the graphic, the client 108 employs the downloaded interpreted-language program, the previously received background graphic data, the previously received variable control configuration information and the newly-received and parsed BCS update values. As noted above, the graphics page, while redrawn completely on the video screen of the client 108, need not be completely reformed when new values are received. Instead, only the affected areas of the graphics page need be reconfigured.

Thus, the web server 104 will automatically provide any new updates to associated BCS values to the client 108, and the client 108 will redraw the graphics page accordingly.

However, it will be appreciated to those of ordinary skill in the art that through operation of the DCOM object of a DCOM server, a request for updates often cannot be left open indefinitely. In particular, after a predetermined time-out period, the BCS data source 102 drops the request if no updates have occurred. In such a case, one embodiment of the invention described herein causes the request to be renewed to avoid being timed out.

In particular, to keep the request for updates alive, the IIS server 402 preferably provides an http message to the client 108 just prior to the end of the time-out period. The downloaded interpreted-language program at the client 108 recognizes the http message and generates a responsive http message. This responsive http message effectively constitutes a new push request http message similar to that of step 702. The IIS server 402 thereafter proceeds with step 704 as described above. Thus, the automatic time-out feature is effectively overcome by lodging a new update request.

It will be appreciated that the above described embodiments are merely exemplary, and that those of ordinary skill in the art may readily devise their own implementations and modifications that incorporate the principles of the present invention and fall within the spirit and scope thereof.

What is claimed is:

1. A building system server, comprising a processing device executing a server program to:
   receive a request from a remote device for information regarding a building control system;
   provide, responsive at least in part to the request for information, at least one software program and at least first data defining a graphical element over the Internet to the remote device, said software program, when executed by said remote device, causes the remote device to i) display at least a first graphical element, the first graphical element having a fixed element and a variable element, the fixed element derived from the first data defining a graphical element, the variable element representative of a first value from a building control system; and generate a function call to a building control system data source, wherein the function call causes the building control system data source to provide to the server program a plurality of subsequent data values associated with the variable element of the first graphical element;

wherein the processing device further executes the software program to provide to the remote device a second value representative of at least one of the plurality of subsequent data values, the second value comprising non-graphical information; and wherein said software program, when executed by said remote device, further causes the remote device to, ii) display the first graphical element such that the variable element is representative of the second value, and display the fixed element using the first graphical data received prior to step i).

2. The building system server of claim 1, wherein the processing device is further configured to provide the second value to the remote device in a mark-up language document.

3. The building system server of claim 2, wherein the mark-up language document further comprises an extensible mark-up language document.

4. The building system server of claim 1, wherein said software program comprises an interpreted software program configured to be executed through a web browser on the remote device.

5. The building system server of claim 1, wherein the processing device further executes the server program to:

responsive to receiving at least one of the plurality of subsequent data values from the building control system data source, provide to the remote device a second value representative of the at least one of the plurality of subsequent data values, the second value comprising non-graphical information.

6. The building system server of claim 1, wherein the software program is written in the Java programming language.

7. The building system server of claim 6, wherein the processing device further executes the Java programming language software program in step ii) to:

execute a mark-up language parsing routine to obtain the second value from a received mark-up language document containing the second value; and generate a graphic using the second value as an operating parameter of a graphics generating routine that causes display of the first graphical element.

8. The building system server of claim 1, wherein the variable element includes a bar graph.

9. The building system server of claim 1, wherein the processing device is further configured to provide the second value to the remote device responsive to receiving a subsequent request from the remote device.

10. The building system server of claim 9, wherein the software program causes the remote device to transmit the subsequent request to the server.

11. A computer program product, comprising a non-transitory computer usable medium having a computer readable program code embodied therein, said computer readable program code adapted to be executed to implement a method, said method comprising:

a) receiving a request from a remote device for information regarding a building control system;

b) providing, responsive to the request for information, at least one software program and at least first data defining a graphical element over the Internet to the remote device, said software program, when executed by said remote device, causes the remote device to, i) display at least a first graphical element, the first graphical element having a fixed element and a variable element, the fixed element derived from the first data defining a graphical element, the variable element representative of a first value from a building control system;

ii) generate a function call to a building control system data source, wherein the function call causes the building control system data source to provide to the server program a plurality of subsequent data values associated with the variable element of the first graphical element;

iii) subsequent to receiving the at least first data and displaying the first graphical element, receive at least a second value representative of at least one of the plurality of subsequent data values and comprising non-graphical information; and iv) display the first graphical element such that the variable element is representative of the second value, and display the fixed element using the first graphical data received prior to step i).

* * * * *